United States Patent [19]

Marino, Jr. et al.

[11] Patent Number: 5,530,758
[45] Date of Patent: Jun. 25, 1996

[54] OPERATIONAL METHODS FOR A SECURE NODE IN A COMPUTER NETWORK

[75] Inventors: Joseph T. Marino, Jr., Fountain Hills; Ernest W. Borgoyne, Jr., Mesa, both of Ariz.

[73] Assignee: Motorola, Inc., Schaumburg, Ill.

[21] Appl. No.: 253,993

[22] Filed: Jun. 3, 1994

[51] Int. Cl.$^6$ .................................................. H04L 9/00
[52] U.S. Cl. .................. 380/49; 380/9; 380/20; 380/23; 380/25
[58] Field of Search ................ 380/4, 9, 21, 23, 380/24, 25, 30, 49, 50, 20

[56] References Cited

U.S. PATENT DOCUMENTS

| | | | |
|---|---|---|---|
| 4,888,801 | 12/1989 | Foster et al. | 380/21 |
| 4,908,861 | 3/1990 | Brachtl et al. | 30/25 |
| 4,932,056 | 6/1990 | Shamir | 380/23 |
| 4,987,595 | 1/1991 | Marino, Jr. et al. | 380/50 |
| 5,010,572 | 4/1991 | Bathrick et al. | 380/21 |
| 5,029,206 | 7/1991 | Marino, Jr. et al. | 380/4 |
| 5,115,466 | 5/1992 | Presttun | 380/9 |
| 5,349,643 | 9/1994 | Cox et al. | 380/25 |

OTHER PUBLICATIONS

"An SDNS Platform For Trusted Products" by Ernie Borgoyne and Ralph G. Puga from FOR Publication at the 15th National Computer Security Conference (NCSC) Oct. 1992.

*Primary Examiner*—Bernarr E. Gregory
*Attorney, Agent, or Firm*—Frederick M. Fliegel

[57] ABSTRACT

A computer network (20) including secure nodes (26) and unsecured nodes (28). The secure nodes (26) may communicate private data without compromising security provisions. The secure nodes (26) include a security kernel (36) that implements communication security provisions and a trusted operating system (40) that imposes computer data security provisions. A trusted interface (44) is used to transfer data between the trusted operating system (40) and the security kernel (36). In addition, this interface (44) insures that computer security attributes are compatible with communication security attributes. If incompatibilities are discovered, requested communications are thwarted and audit records for the security linkage violations are recorded.

27 Claims, 8 Drawing Sheets

| CHANNEL IDENTIFICATION | | |
|---|---|---|
| CHANNEL NAME | KEY INDEX | CHANNEL SECURITY ATTRIBUTE |
| --- | --- | --- |
| --- | --- | --- |
| ⋮ | ⋮ | ⋮ |
| --- | --- | --- |

FIG. 6

| LOCAL APPLICATION ACCESS CONTROL | |
|---|---|
| APPLICATION | COMPUSEC ATTRIBUTE |
| --- | --- |
| --- | --- |
| ⋮ | ⋮ |
| --- | --- |

OPERATIONAL METHODS FOR A SECURE NODE IN A COMPUTER NETWORK

RELATED PATENTS

The present invention is related to U.S. Pat. No. 5,029,206, entitled "Uniform Interface For Cryptographic Services," by Joseph T. Marino, Jr. and Paul A. Lambert, and to U.S. Pat. No. 4,987,595, entitled "Secure Cryptographic Processor Arrangement," by Joseph T. Marino, Jr. and Ronald S. Core, both of which are assigned to the same assignee as the present application and both of which are hereby incorporated herein by reference.

TECHNICAL FIELD OF THE INVENTION

The present invention relates generally to computer systems and to communication systems, and, more specifically, to linking computer security provisions to communication security provisions in the context of a computer network.

BACKGROUND OF THE INVENTION

A variety of solutions have evolved to provide and maintain the security of private information. For example, communication security (COMSEC) has evolved to protect information being communicated over unsecured communication channels. Generally speaking, COMSEC provides encryption and decryption standards along with the management of cryptographic keys/security certificates used in encryption and decryption processes and communication of private signals over unsecured communication channels.

An alternative field of computer security (COMPUSEC) has evolved to protect computer-processed information. COMPUSEC provides trusted applications that maintain separation of data having different security attributes within a computer system. Trusted/secure applications performed by computers tightly manage the users who may access the applications, provide audit trails and limit the types of activities performed to those for which security can be maintained. An underlying assumption of COMPUSEC is that protected computer processing takes place within a secure area and that other procedures are enacted to limit access to the computer and its data.

Modern computing trends are leading to increased computer networking so that data may be shared between computers. An increasing number of highly valuable applications are being developed specifically for networked use. However, prior art networking technology violates the basic premises upon which COMPUSEC is founded.

COMSEC provisions might be employed to allow networking of secure computers over unsecured data channels. Simple porting of COMPUSEC data to a COMSEC system would not work. A weak security interface exists at the point where secure information passes between a COMPUSEC protected system (e.g., a computer) and a COMSEC protected system (e.g., a communication channel). At this point, opportunities exist for security violations (e.g., releasing confidential or classified information to an unauthorized entity).

SUMMARY OF THE INVENTION

Accordingly, it is an advantage of the present invention that an improved method of operating a secure node in a computer network is provided.

Another advantage of the present invention is that a secure interface is provided between a COMPUSEC protected system and a COMSEC protected system.

Another advantage is that the present invention provides a set of common communication-oriented services that may achieve a trusted status in a COMPUSEC protected system.

Another advantage is that the present invention provides a set of common communication-oriented services that simplify the development of network applications for secure computers and that simplify the investigations needed to verify the secure nature of such applications.

The above and other advantages of the present invention are carried out in one form by a method of operating a secure node in a computer network. The method calls for performing a trusted process on the secure node. The trusted process associates security attributes with data provided by the process. A security kernel for managing communications with other nodes on the network is established. The security kernel associates communication security attributes with communication channels. The method additionally makes a determination concerning whether the trusted process data security attributes are compatible with the communication security attributes.

BRIEF DESCRIPTION OF THE DRAWINGS

A more complete understanding of the present invention may be derived by referring to the detailed description and claims when considered in connection with the Figures, wherein like reference numbers refer to similar items throughout the Figures and:

DETAILED DESCRIPTION OF THE PREFERRED EMBODIMENTS

Figure 1:
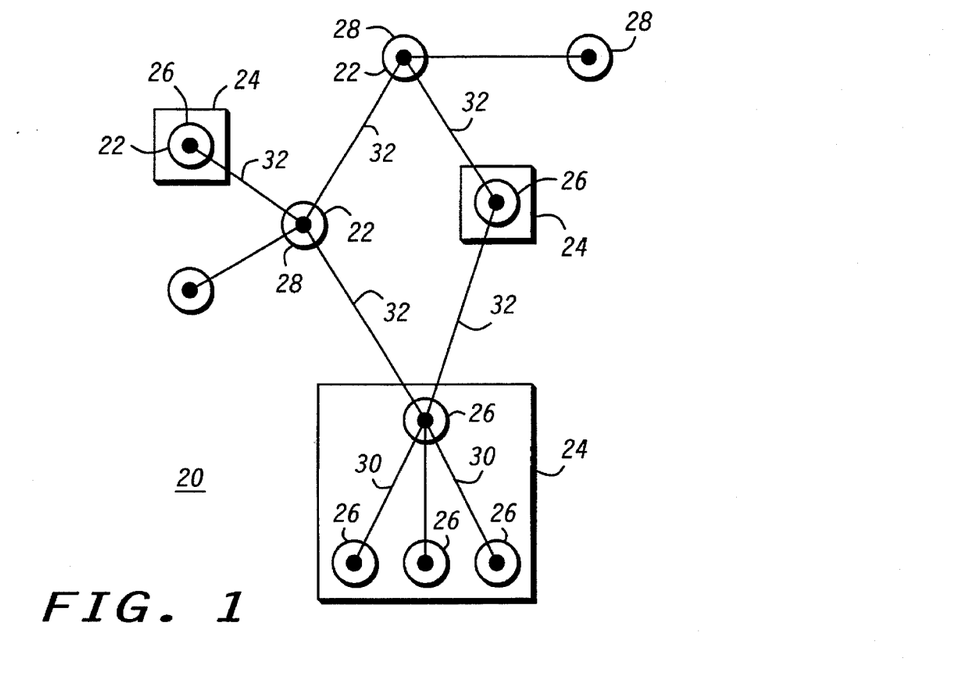
FIG. 1 is a nodal diagram of a computer network with which methods for operating secure computer nodes may be practiced.

As employed herein, the terms "server", "file server", "mail server", "file or mail server" and "file/mail server" are interchangeable and are taken to mean a server for receiving, storing and/or transmitting files such as electronic mail, generally as an intermediary between two or more other entities. FIG. 1 is a nodal diagram of an exemplary computer network 20. Network 20 includes many computer nodes 22, each of which represents any type of computerized device, e.g., a workstation, server, router, bridge, gateway etc., that may transmit or receive data from network 20. The particular topology illustrated in FIG. 1 is presented for purposes of illustration only. A portion of nodes 22 are confined in secure areas 24 and are referred to as secure nodes 26. Nodes 22 not confined in secure areas 24 are referred to as unsecured nodes 28. In some applications, secure area 24 may be a building or room, while in others, secure area 24 may be a housing or other encasement for computer components.

Secure communication links 30 of network 20 are entirely confined within secure areas 24 and couple only to secure nodes 26. Unsecured communication links 32 couple to at least one unsecured node 28 or secured node 26. Network 20 need not be a secure network, as indicated by the presence of unsecured nodes 28 and unsecured links 32. Nevertheless, in accordance with the present invention, isolated unsecured nodes 28 may operate on network 20 without violating or compromising the security services and assurances provided within secure areas 24.

Figure 2:
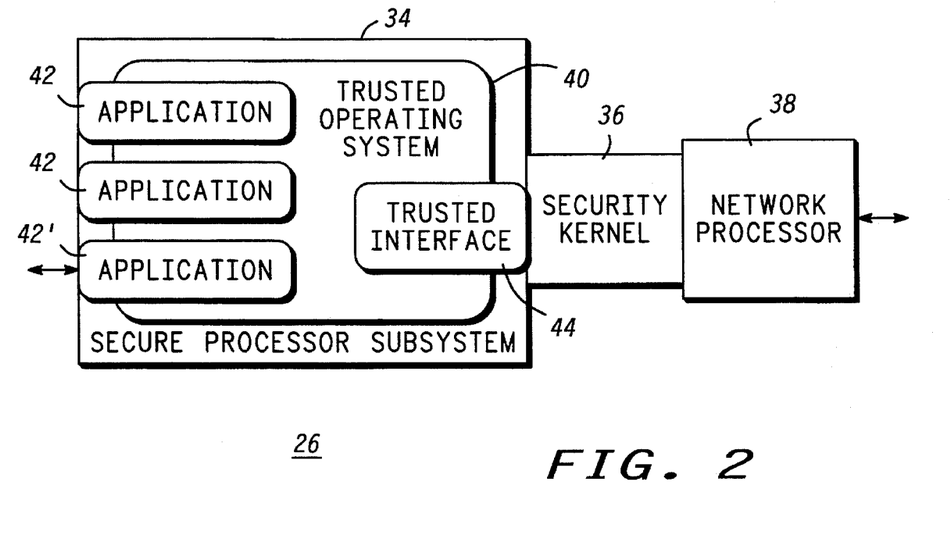
FIG. 2 is a block diagram of a secure computer node upon which methods configured in accordance with the present invention may be practiced.

FIG. 2 is a block diagram of a secure workstation node 26 upon which methods configured in accordance with the present invention may be practiced. Node 26 is characterized as a workstation for convenience in explaining the present invention, but node 26 is not limited to being only a workstation. As a secure workstation, node 26 includes secure processor subsystem 34, security kernel 36 and network processor 38 as described, for example, in "An INFOSEC Platform for Trusted Products", 15$^{TH}$ National Computer Security Conference Proceedings.

Security kernel 36 and network processor 38 represent conventional systems of hardware and software which provide communication security (COMSEC) services and assurances related to communicating data over unsecured network 20. Generally, security kernel 36 provides for key management, public key exchange sequences, encryption, decryption and related services used in encrypting private data for transmission over an unsecured channel and for decrypting data received from the unsecured channel. Security kernel 36 manages communications by exchanging security certificates directly with like security kernels 36 in other secure nodes 26 on network 20 or indirectly via unsecured nodes 28 acting as a server for mail or other file communication applications. Security certificates include a public encryption key along with other data identifying COMSEC services being offered. By evaluating security certificates, two security kernels 36 identify an appropriate communication security attribute to associate with the communication channel. The COMSEC attribute characterizes a level of security associated with the channel, e.g., confidential, secret, top secret etc. The above-listed patents provide additional details regarding the operation of security kernel 36 and network processor 38.

Secure processor subsystem 34 employs conventional computer security (COMPUSEC) services and assurances to provide for the security of private data being processed and stored thereon. In many respects, subsystem 34 may resemble a conventional general purpose computer. However, subsystem 34 is usually maintained within the confines of secure area 24 (FIG. 1). Trusted operating system (TOS) 40 manages the operation of applications 42 performed by subsystem 34. As with general purpose computers, a wide range and variety of applications may be supported by subsystem 34. However, for purposes of the present invention, applications 42, such as electronic mail and others, which import or export data from outside subsystem 34 are the most relevant.

TOS 40 is a trusted process (i.e., software package) providing COMPUSEC features. Assurances must be made that the software comprising TOS 40 is delivered and installed in a trusted manner such that no modifications are made to the software prior to installation. However, for purposes of the present invention, a trusted process is one that interfaces with COMSEC services, whether or not certified. Among the COMPUSEC-related features, TOS 40 manages log-on provisions, associates data or computer security attributes with blocks of data processed and stored thereon, manages application access control and provides for auditing security violations. Many different trusted operating systems are commercially available.

In addition, trusted driver or interface 44 operates on secure processor subsystem 34. Interface 44 passes data between security kernel 36 and operating system 40 and links the COMPUSEC provisions of subsystem 40 with the COMSEC provisions of security kernel 36. Operation of interface 44 and network 20 are discussed below (see FIGS. 3–12).

Generally, interface 44 provides a common set of services useful to TOS 40 and to applications 42. These common services form a standard interface for communicating data from one secure node 26 to another over unsecured network 20. The standard interface operates under the control of TOS 40 and may itself be certified as being trusted. Applications 42 which import or export data may rely upon the standard interface to ease their development. Investigating and evaluating security ramifications of applications 42 is eased because the opportunity for security violations diminishes.

Figure 3:
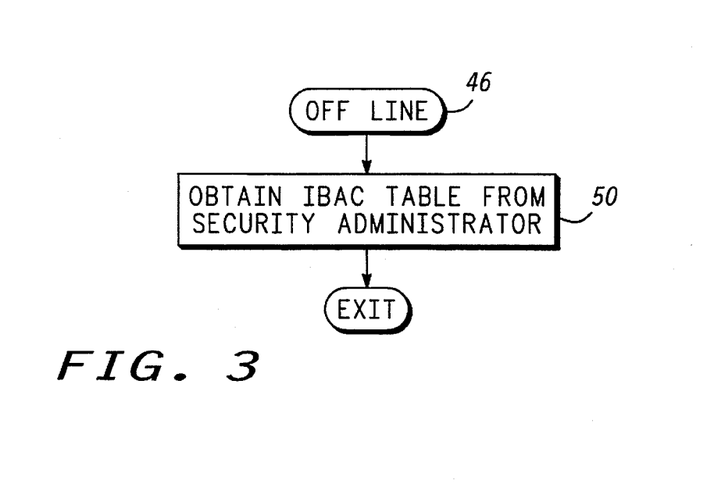
FIG. 3 is a flow chart of an off-line process performed by a trusted interface.
Figure 4:
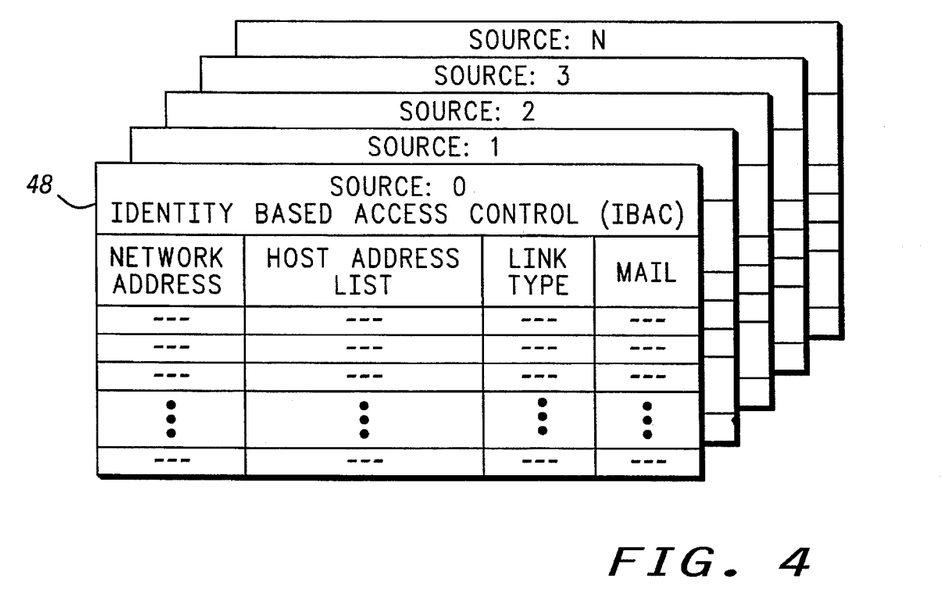
FIG. 4 is a diagram of an exemplary data format for an identity-based access control table utilized by the trusted interface.

FIG. 3 is a flow chart of off-line process 46 performed by trusted interface 44 (FIG. 2). Off-line process 46 is performed when a security administrator for secure node 26 (the person responsible for security provisions with respect to node 26) loads identity based access control (IBAC) table 48, an exemplary block diagram of which is shown in FIG. 4, into node 26 for use by interface 44. Process 46 performs task 50 to obtain IBAC table 48 from a configuration storage device (e.g., disk) and store table 48 for subsequent on-line access by interface 44.

IBAC table 48 (FIG. 4) includes data associations used by interface 44 in making access control verifications with respect to requests to pass data into and out from secure subsystem 34 (FIG. 2). Access control verifications relate to the manner in which a particular security system is configured and are implemented to limit access to information in a manner determined by the security administrator.

IBAC table 48 includes a list of logical network addresses. When application 42 (FIG. 2) requests communication with another node, the request references the network address. For each network address, a list of host addresses may be provided. The list of host addresses determines a series of hosts comprising a communication path that must be followed in reaching the specified node. This list may specify routing through any number of intermediate nodes and processes. When a network address is omitted from table 48, then application 42 cannot access that network address.

A link type data element is also associated with network addresses in IBAC table 48. The link type data element specifies whether the associated network address may be reached through a secure communication link 30 (FIG. 1) or an unsecured link 32. When secure link 30 is available, the services of security kernel 36 (FIG. 2) are not required. Communication may take place through a local application (e.g., application 42') and the link type data element may specify the identity of application 42'. When only an unsecured link 32 is available, the services of security kernel 36 are required.

IBAC table 48 also includes one or more stored (e.g., mail) data elements associated with network addresses. The data elements may be interpreted differently, depending upon the nature of the entity identified by the network address (e.g., mail, encrypted files etc.). For example, when a network address specifies a potential destination entity for mail data, the mail data elements may specify the identity of a mail server and a mail box address to use in delivering secure electronic mail. The term "mail data" refers to data communicated to another node. Electronic mail facilities are not required and no limitations are applied upon the nature of the communicated data.

IBAC table 48 may additionally include a separate page for each of several different source applications 42 (FIG. 2) that may wish to import or export data. Each page may include a set of network addresses and associated data valid only for the page's source application 42.

Figure 5:
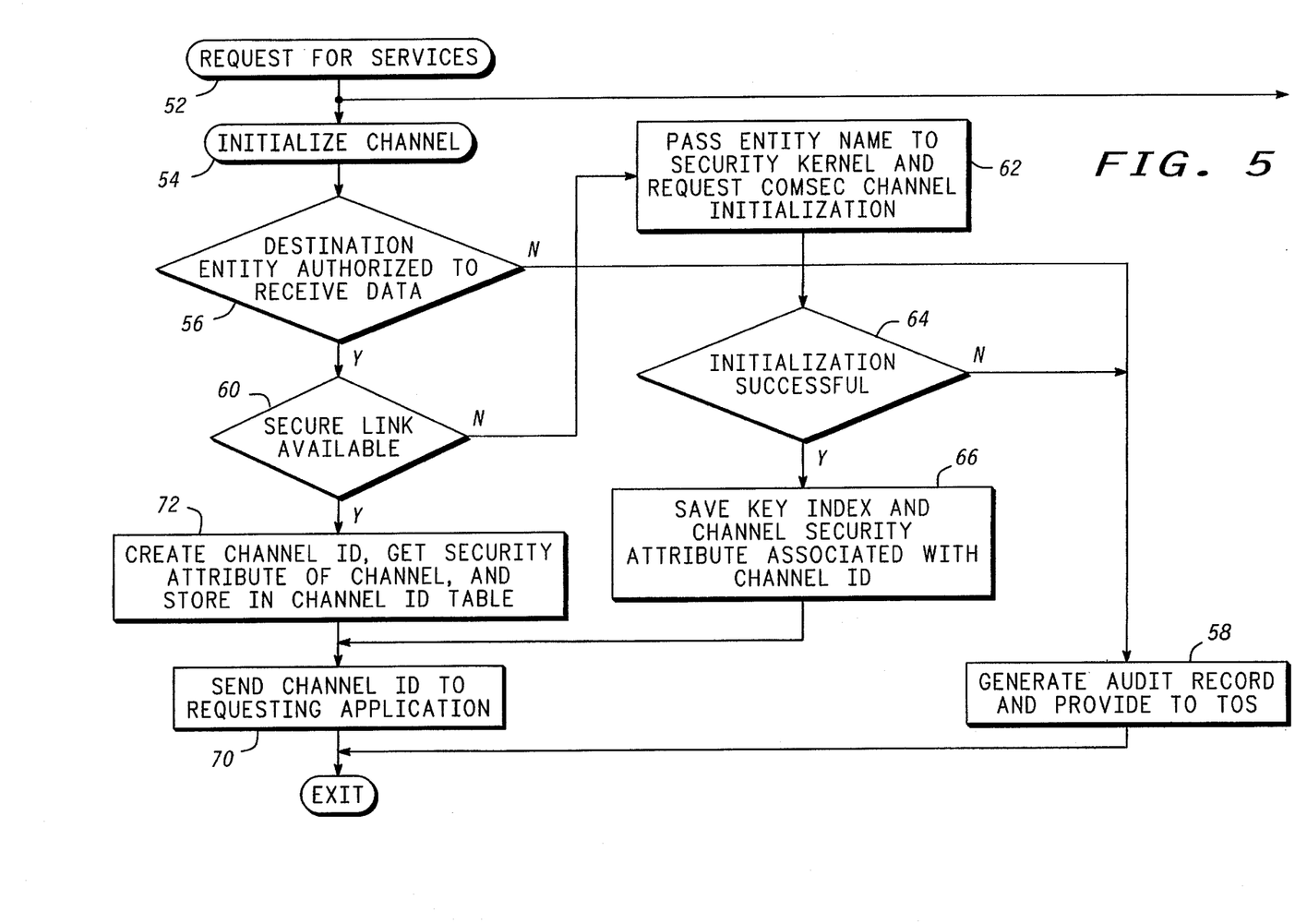
FIG. 5 is a flow chart of a first portion of a request for services procedure performed by the trusted interface.

FIG. 5 is a flow chart of a portion of request for services procedure 52 performed by trusted interface 44 (FIG. 2) of secure node 26. Procedure 52 may be invoked when source node 26 wishes to send private data through network 20 to a destination node 26, when destination node 26 receives private data or when mail server node 26 receives private data for temporary storage therein or forwards such data. Procedure 52 includes several processes selected and performed in response to the requested service.

Procedure 52 performs initialize channel process 54 as the first part of a request to exchange private data with a destination. In order to transmit private data, application 42 (FIG. 2) first initializes and then sends data through a channel. A request for initializing a channel informs interface 44 of the network address for which a channel initialization process 54 is being requested.

Process 54 performs query task 56 to determine whether the destination specified by the request is authorized to receive private data. Task 56 may evaluate IBAC table 48 (FIG. 4) in making its determination. When the destination's network address is specified for an appropriate source, the source entity is authorized to transmit private data to the destination. However, when the destination's network address is not specified in IBAC table 48, no authorization is given and task 58 is performed to generate an audit record and provide the audit record to TOS 40 (FIG. 2), which records the audit record.

Verification for source entity authorization and auditing of security violations represent links provided by interface 44 between COMSEC and COMPUSEC, without which potential exists for private data to be communicated to entities who have no need to know or for violations to go unnoticed. When the destination is not authorized, program control exits process 54 from task 58 and no channel is established or otherwise initialized.

When task 56 determines that the requested destination entity is authorized, query task 60 determines whether secure link 30 (FIG. 1) is available for exchanging data with the destination entity. Task 60 may, for example, consult IBAC table 48 (FIG. 4) in making its determination. When no secure link 30 is available, unsecured link 32 (FIG. 1) must be used and the services of security kernel 36 (FIG. 2) are needed. Thus, when secure link 30 is not available, task 62 passes the path name of the destination entity, which may be obtained from the host address list in IBAC table 48, to security kernel 36 and requests a COMSEC secure channel initialization through security kernel 36.

Security kernel 36 passes the destination entity name to network processor 38 (FIG. 2) to look up network address information and to establish an association with the destination's security kernel 36. Source and destination security kernels 36 use this association to exchange security certificates. During certificate exchange, source and destination security kernels 36 send each other security certificates containing logical names for the devices and COMSEC attributes. Security kernels 36 check that the names and COMSEC attributes contained in the key material received are the same as those requested. So long as security provisions are in order, security kernels 36 then determine the intersection of the devices' COMSEC attributes and this becomes the COMSEC attribute for the channel currently being initialized. Additional checks may be performed by security kernels 36. When all these checks pass, traffic (encryption/decryption) keys are created and stored within the security kernels' memories.

A secure channel has now been initialized through unsecured links 32 (FIG. 1) in network 20. After task 62, interface 44 performs query task 64 to determine whether the initialization was successful. When initialization is unsuccessful, task 58 is performed to generate an audit record and provide the audit record to TOS 40 (FIG. 2). On the other hand, when secure channel initialization is successful, security kernel 36 passes a key index, channel ID (representing a logical name assigned to the initialized channel) and COMSEC attributes for the channel back to interface 44. The key index represents a code that security kernel 36 may use later to obtain the traffic encryption key for sending data through the initialized channel. A similar key index is stored on the network processor of the destination secure node 26 which is used to obtain the decryption key for receiving data. The actual traffic keys remain in the respective security kernels 36.

Figure 6:
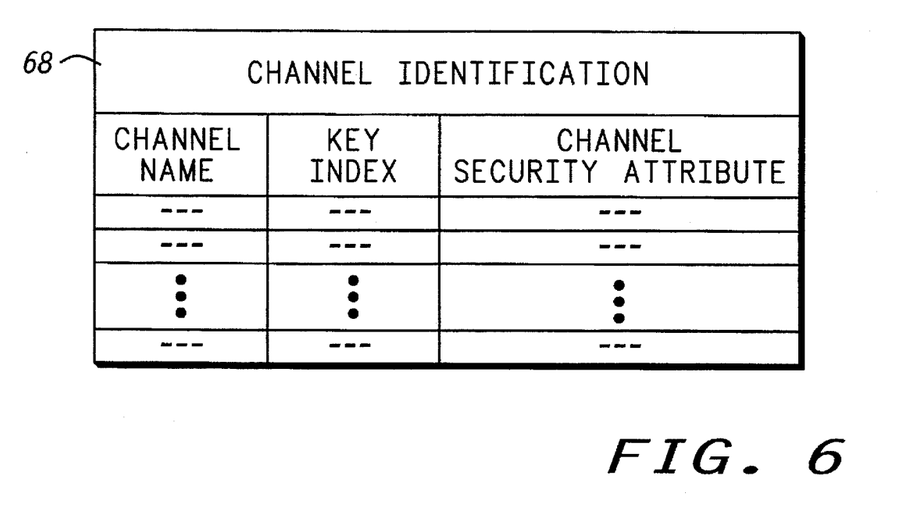
FIG. 6 is a block diagram of an exemplary data format for a channel identification table utilized by the trusted interface.

Task 66 in interface 44 saves the key index and COMSEC attribute in association with the channel ID in channel ID table 68 (FIG. 6). After task 66, task 70 sends the channel ID to the application 42 (FIG. 2) that requested the channel initialization. When application 42 later requests the sending of data through the initialized channel, it will refer to the channel by using the channel ID. After task 70, program control exits process 54.

Referring to task 60, when secure link 30 (FIG. 1) is available for communicating, services of security kernel 36 are not needed. Accordingly, process 54 simulates the operation of security kernel 36 to promote standardization of secure channel usage within network 20, i.e., task 72 creates a channel ID, gets a COMPUSEC attribute to associate with the secure channel and stores this information in channel ID table 68 (FIG. 6).

Figure 7:
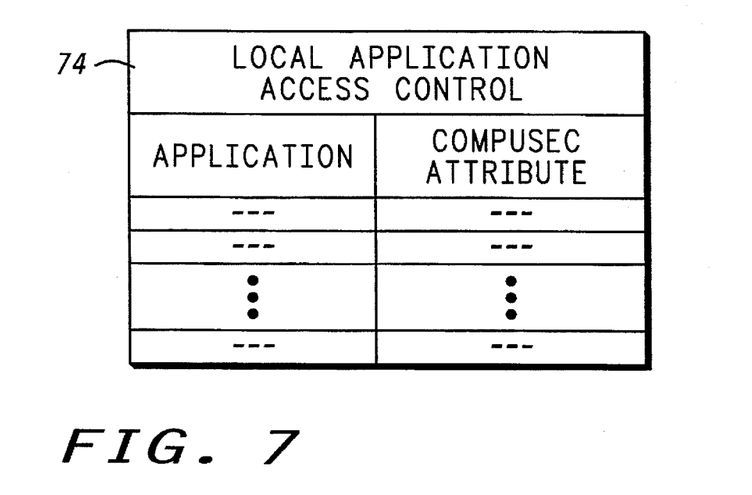
FIG. 7 is a block diagram of an exemplary data format for a local application access control table maintained by a trusted operating system.

The COMPUSEC attribute may be obtained, for example, from a conventional local application access control table 74, an exemplary block diagram of which is shown in FIG. 7. TOS 40 (FIG. 2) maintains table 74 in a conventional manner. Table 74 associates COMPUSEC data security attributes (e.g., highest and lowest security levels, compartments etc.) with each application authorized to run at node 26 (FIG. 1). Typically, another application, such as application 42' (FIG. 2) operates secure link 30 (FIG. 1). Thus, task 72 (FIG. 5) may request TOS 40 to return the COMPUSEC attribute for the application 42' operating secure link 30. This attribute may be assigned to the channel being initialized.

Referring to FIG. 5, after task 72, process 54 performs task 70 to send the channel ID to the requesting application 42 and exits.

Figure 8:
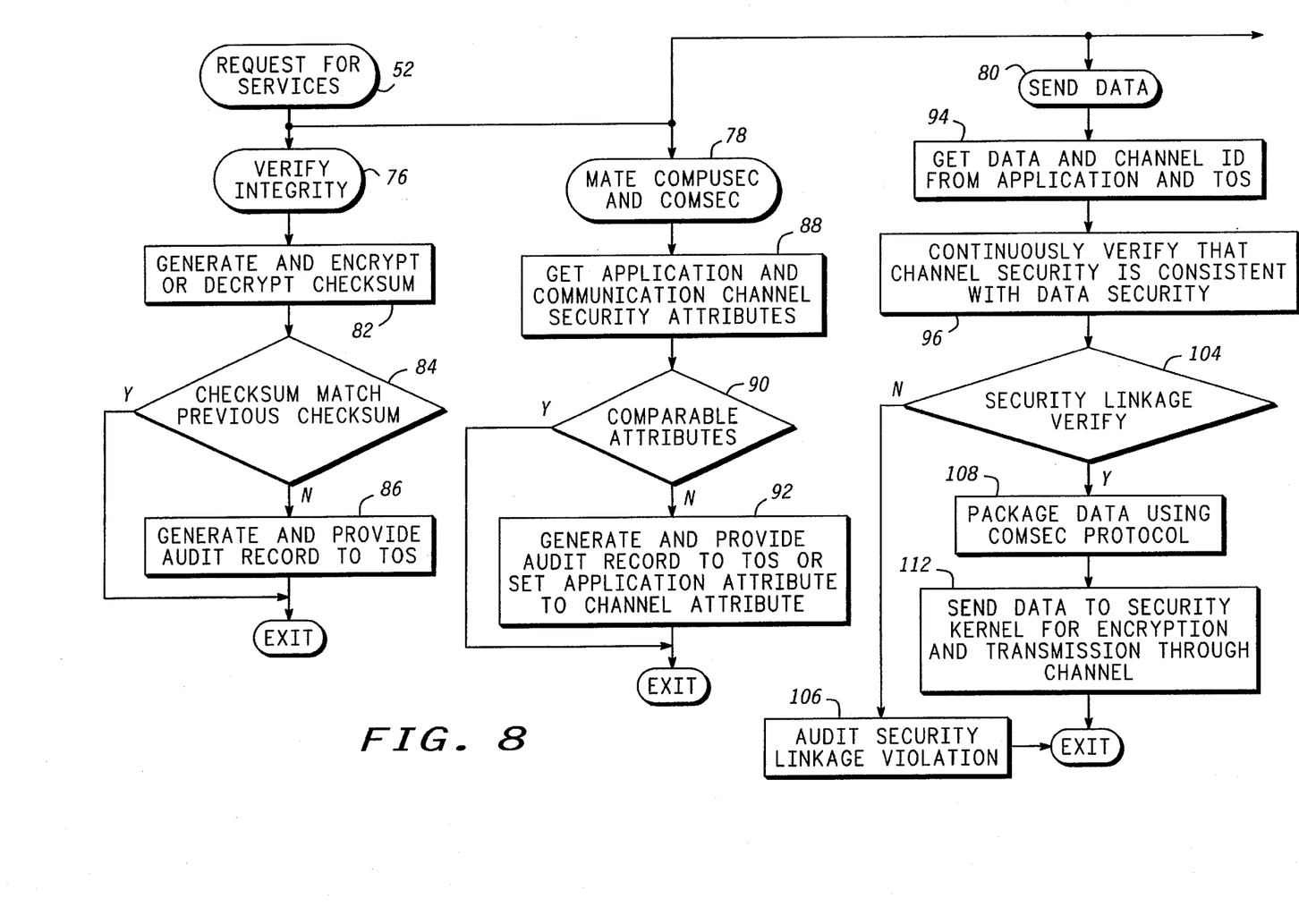
FIG. 8 is a flow chart of a second portion of the request for services procedure performed by the trusted interface.

FIG. 8 is a flow chart of additional portions of request for services procedure 52, a first portion of which is shown in FIG. 5. FIG. 8 shows flow charts for verify integrity process 76, mate COMPUSEC and COMSEC process 78 and send data process 80. Processes 76, 78 and 80 represent additional services that may be requested by application 42 or by TOS 40 (FIG. 2).

Verify integrity process 76 is performed to verify the integrity of software running on secure processor subsystem 34 (FIG. 2). During an initial load of application 42 onto subsystem 34, a checksum may be generated and compared against a given value to insure that the integrity of application 42 remains intact. In addition, this checksum may be performed at any other time (e.g., whenever application 42 is loaded for execution).

Process 76 performs task 82 to generate and encrypt or decrypt a checksum, which may be generated by application 42, TOS 40, interface 44 and/or security kernel 36 (FIG. 2). Encryption or decryption is desirably performed in security kernel 36. Encryption may be performed to encrypt a checksum for storage or for comparison to another encrypted checksum. Decryption may be performed to decrypt a previously encrypted checksum for comparison to another checksum.

Query task 84 then determines whether current and previous checksums match. When checksums match, program control exits process 76 and an "all clear" message (not shown) may be returned to the requesting entity. When checksums do not match, task 86 generates an audit record and provides the record to TOS 40 (FIG. 2).

Mate COMPUSEC and COMSEC process 78 may be performed for either of two reasons. COMPUSEC attributes may be set to a level compatible with COMSEC attributes currently established for secure node 26 or a check may be performed to verify that COMPUSEC and COMSEC attributes are compatible. Process 78 performs task 88 to get application and communication channel security attributes. Local application access control table 74 (FIG. 7) may be consulted to obtain COMPUSEC attributes for a specified application 42. Security kernel 36 may be queried to determine a current COMSEC attribute.

Query task 90 then compares attributes. This comparison need not look for equal attributes and may look for an intersection or dominance of attributes, depending on the security policy being enforced. For example, when application 42 is authorized to handle "confidential" data and security kernel 36 is configured to communicate more private "secret" data, comparable attributes may not be indicated. However, when application 42 is authorized to handle "secret" data and security kernel 36 is configured to communicate "confidential" data, comparable attributes may be indicated.

When comparable attributes are indicated, program control may exit process 78 and an "all clear" message (not shown) may be returned to the requesting entity. When comparable attributes are not indicated, task 92 may generate an audit record and provide the audit record to TOS 40. This action may be taken when process 78 is performed to verify compatible COMPUSEC and COMSEC security attributes. Alternatively, task 92 may cause an application's COMPUSEC attribute in local application access control table 74 (FIG. 7) to match the COMSEC attribute when process 78 is performed to set the application's COMPUSEC attribute to an appropriate level. After task 92 program control exits process 78.

Send data process 80 is requested to send data over a previously initialized secure channel and represents the second half of a request to transmit private data. The secure channel may be formed over either secure link 30 (FIG. 1) or unsecured link 32. Process 80 performs task 94 to get the data to be sent and the ID of the channel over which the data will be sent. This information may be passed to interface 44 from application 42 and/or TOS 40 when process 80 is requested.

Figure 9:
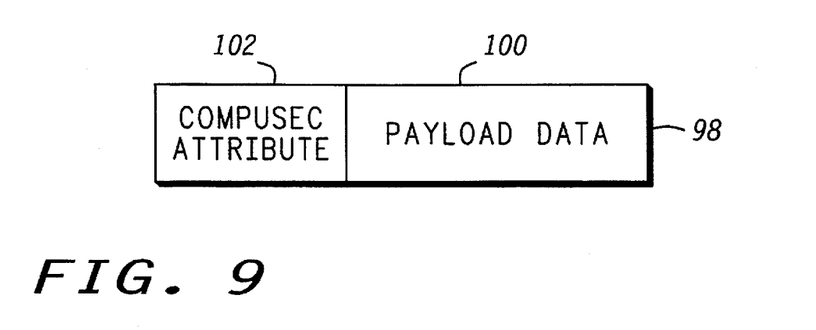
FIG. 9 is an exemplary data format diagram of a data packet or block provided by the trusted operating system and applications running thereunder.

Task 96 continuously verifies that channel and data security attributes are consistent. By continuously verifying, task 80 desirably makes its verification for each block 98, packet or other unit of data passed to it from TOS 40. FIG. 9 shows an exemplary data format diagram for block 98 of data passed through TOS 40. Block 98 includes payload data 100 and header 102. Header 102 conveys a COMPUSEC attribute which identifies the data security level associated with block 98. Other data may also be included in header 102.

Referring to FIG. 8, the channel security level may be determined by consulting channel ID table 68 (FIG. 6). A COMSEC channel security attribute is associated with the channel name given to process 80 from requesting application 42. Thus, for each block 98 (FIG. 9) of data being sent away from secure node 26, task 96 verifies compatibility of COMPUSEC and COMSEC security. When the security linkage cannot be verified, query task 104 routes program control to task 106, which audits the security linkage violation by generating an audit record and providing this to TOS 40. Program control then exits process 80.

Figure 10:
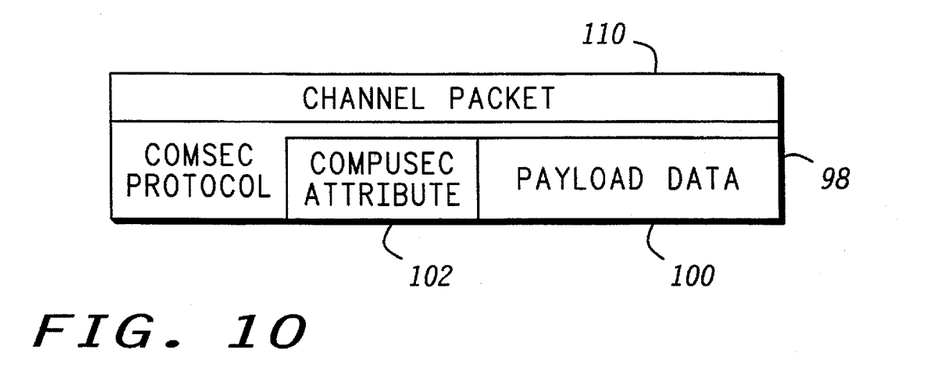
FIG. 10 shows an exemplary data format diagram of a channel data packet or block.

The following example illustrates the case where data are sent over unsecured link 32. In the case where data are to be sent over secured link 30, data are simply routed to destination application 42 via the specified channel ID. When task 104 determines that the security linkage is verified, task 108 packages data block 98 (FIG. 9) in channel data packet 110, an exemplary data format diagram of which is shown in FIG. 10. Channel data packet 110 is packaged using a predetermined COMSEC security protocol (e.g., SP3 or NLSP). The COMSEC attribute portion of the security protocol may be written to packet 110 (FIG. 10) at interface 44. This COMSEC attribute may be obtained by consulting channel identification table 68 (FIG. 6). After task 108, task 112 sends data packet 110 to security kernel 36 along with the key ID. Security kernel 36 encrypts the data and may add additional components to the security protocol. Security kernel 36 passes packet 110 to network processor 38, where it is eventually transmitted through the identified channel. Program control then exits process 80.

Figure 11:
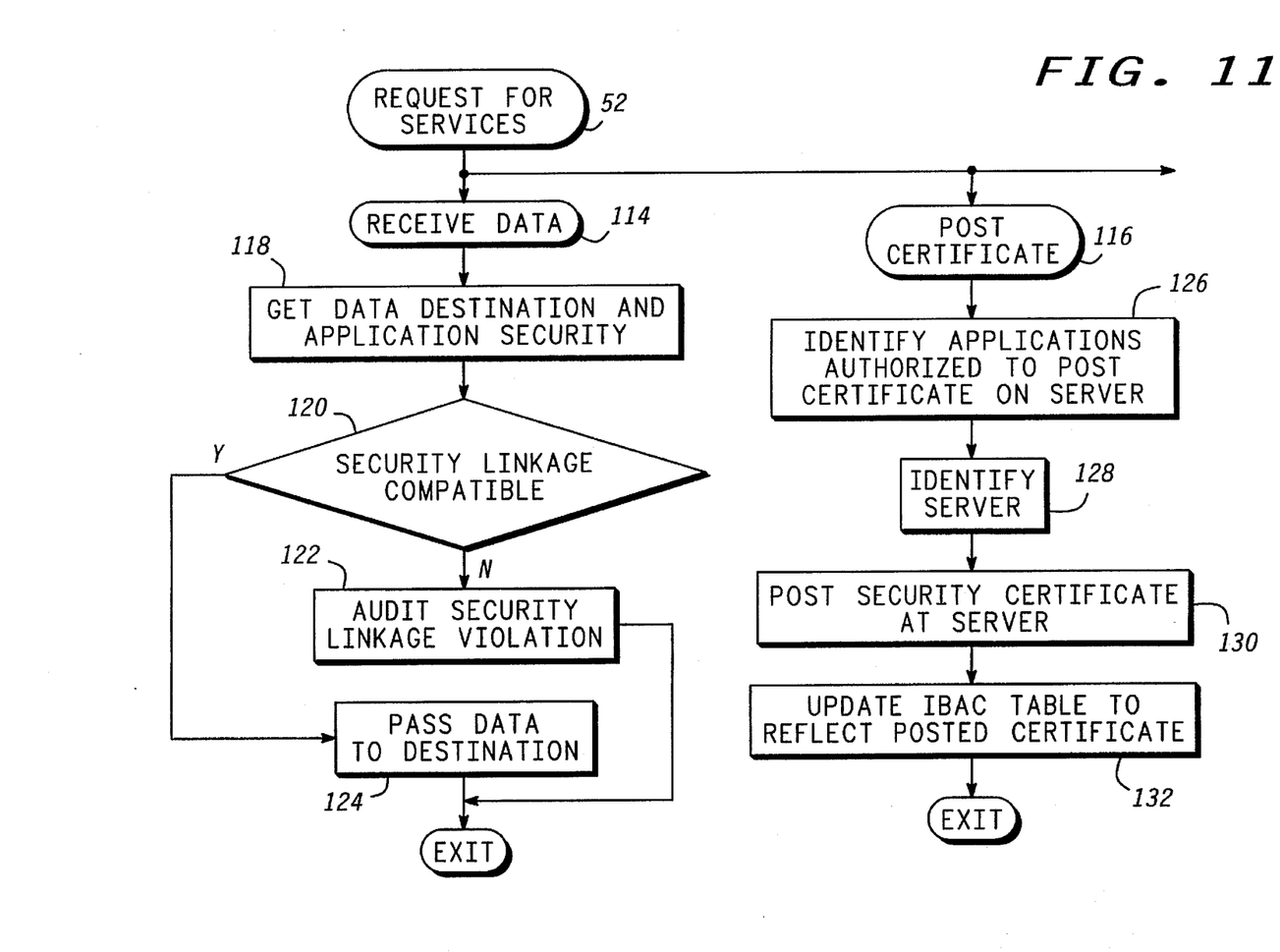
FIG. 11 is a flow chart of a third portion of the request for services procedure performed by the trusted interface.

FIG. 11 is a flow chart of additional portions of request for services procedure 52, receive data process 114 and post certificate process 116.

In the case where private data are received over unsecured link 32, receive data process 114 is requested by security kernel 36 when secure node 26 is a destination for a secure transmission and when private data are received. When interface 44 is invoked, the private data have been decrypted through security kernel 36. These data indicate the destination entity (e.g., a specified application 42) for the data and the COMSEC and source COMPUSEC attributes for the data. In the case where private data are received over secured link 30, receive data process 114 is requested by source application 42 running on the same secure node 26.

Process 114 performs task 118 to get the destination application 42 for the data and the COMPUSEC attribute associated with the destination. The destination's COMPUSEC attribute may be obtained from local application access control table 74 (FIG. 7). Query task 120 then determines whether security linkages are compatible, i.e., task 120 resolves whether the COMSEC attribute is compatible with the destination COMPUSEC attribute, as discussed above. When security linkages are not compatible, task 122 is performed to audit the security linkage violation, program control exits process 114, and received data are not presented to the destination application 42 and may be scrubbed from subsystem 34 (FIG. 2). When task 120 determines that security linkages are compatible, task 124 passes the data to the intended destination application 42 and exits process 114.

Post certificate process 116 is configured to support secure data storage functions (e.g., electronic mail) on unsecured network 20. Process 116 is requested by application 42, e.g., an electronic mail installer program, during a setup or installation phase and may be requested when security certificates are changed. Process 116 posts the public security certificate for the node's security kernel 36 with common unsecure node 28 (e.g., a mail server). This security certificate is used so that other participating nodes 26 may later receive secure files or electronic mail.

Process 116 performs task 126 to identify applications authorized to participate in a shared secure file or mail system and may evaluate local application access control table 74 (FIG. 7) and/or IBAC table 48 (FIG. 4) in making this determination. Task 128 may, for source and destination entities authorized as indicated in tables 48 and 74, then identify a file or mail server to use. The file or mail server may be identified by consulting the mail data elements associated with a potential destination authorized to receive secure data or electronic mail.

In the context of secure electronic mail communications or file storage, the ultimate destination of the data need not be the server itself. Rather, the destination is that secure node 26 for which the data are ultimately intended. Unsecure server node 28 may be used to temporarily store the data until they can be delivered to their ultimate destination. Likewise, the ultimate destination entity need not be a different node from the source node. Thus, in some situations, unsecure server node 28 may be used as a remote storage facility for another secure node 26.

Task 130 then causes the COMSEC security certificate held in security kernel 36 to be posted at the file/mail server. Task 130 operates in a manner similar to that discussed above for initialize channel process 54 (FIG. 5), except that no real time exchange of certificates is done. Secure node 26 posting its security certificate sends its security certificate to the server as occurs when a secure channel is being initialized. The server saves this security certificate in association with a file location (e.g., mail box address), which it passes back to the source of the posted security certificate. When the file location has been returned, the channel need not remain initialized. Task 132 then updates IBAC table 48 to reflect the posted status for the node's security certificate and program control exits process 116.

Figure 12:
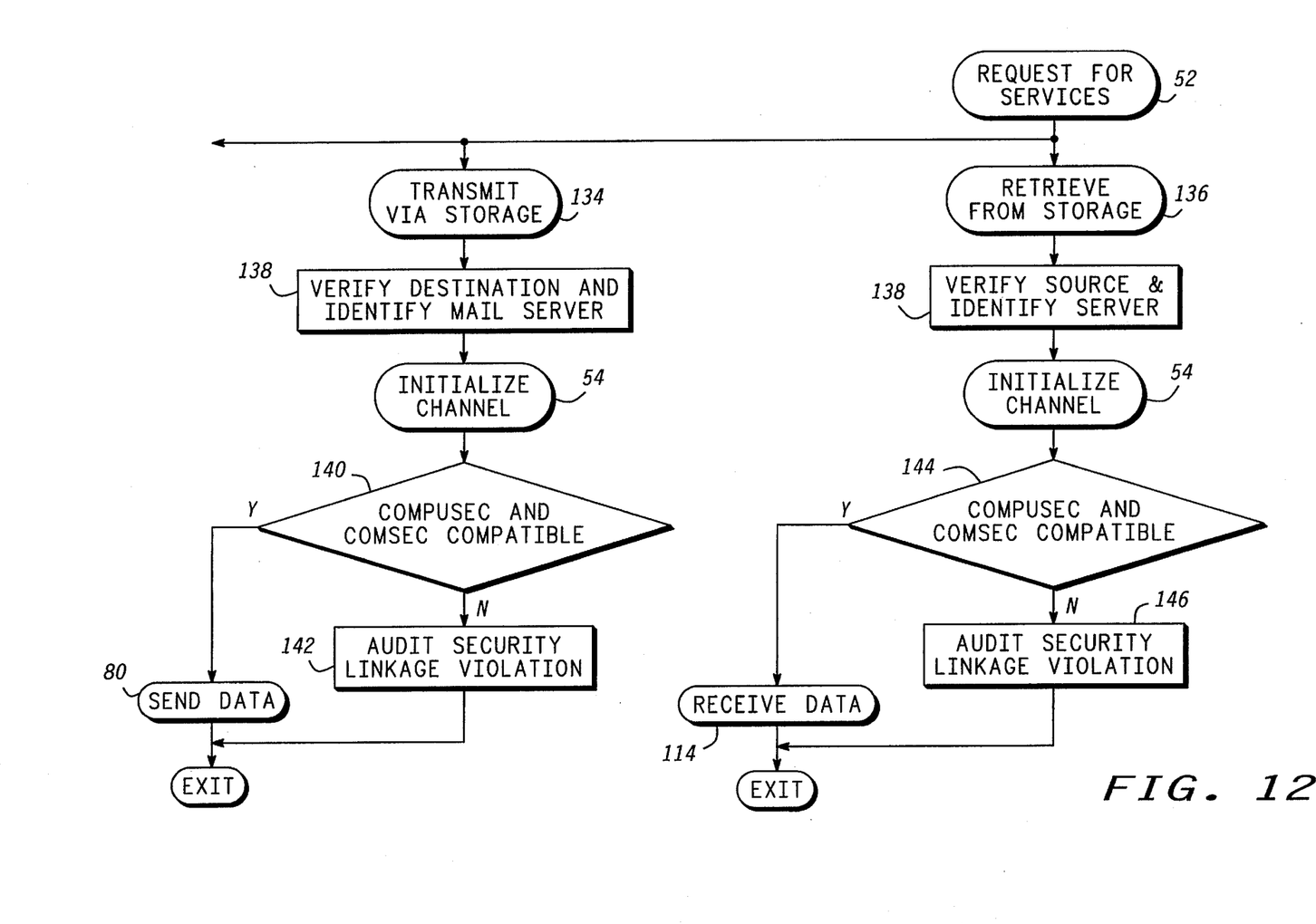
FIG. 12 is a flow chart of a fourth portion of the request for services procedure performed by the trusted interface.

FIG. 12 is a flow chart of additional portions of request for services procedure 52, showing flow charts for transmit via storage process 134 and retrieve from storage process 136.

Processes 134 and 136 represent additional services that may be requested by electronic mail application 42 (FIG. 2) through TOS 40. For purpose of discussion and to provide a clear example, application 42 is assumed to be an electronic mail application, however, it will be appreciated by those of skill in the relevant arts that application 42 may comprise secure file storage and retrieval functions, among other things.

Process 134 is requested when electronic mail application 42 wishes to transmit mail data to a destination via a mail server's data storage facility. The request identifies an ultimate destination for the mail data, which may be a different node 26 from requesting node 26 or the same node. Task 138 verifies authorization for the ultimate destination of the mail data and identifies a mail server to use for the transmission. Audit trails (not shown) may be formed for any security linkage violations discovered through the verification, as shown at tasks 56 and 58 in process 54 (FIG. 5). The mail server may be identified by examining the mail data element associated with the ultimate destination's entry in IBAC table 48 (FIG. 4).

When task 138 determines that the destination and mail server are valid, process 134 performs, either automatically or as a result of subsequent requests from application 42, initialize channel process 54 (FIG. 5), which initializes a secure transmit channel using the posted security certificate from the ultimate destination entity in initializing a secure channel. When a security certificate has not been posted by the intended recipient at the server, the initialization fails and an audit record is generated by process 54. Otherwise, a traffic encryption key is formed by security kernel 36 that is identical to one that would have been formed if a channel were being initialized directly with the ultimate destination entity. Process 54 causes a COMSEC attribute to be associated with the initialized communication channel. Query task 140 then compares attributes to determine compatibility. When they are not compatible, task 142 audits a security violation and process 134 terminates. Otherwise, process 134 then performs, either automatically or as a result of requests from application 42, send data process 80 (FIG. 8), which causes mail data to be encrypted through security kernel 36 and transmitted through the initialized channel to the mail server.

Process 136 is requested when a destination for secure electronic mail wishes to receive any mail stored for it at the mail server. As discussed above, the destination may, but need not, be the same node 26 that sent the electronic mail to the mail server. Task 138 identifies the application 42 making the request and the mail server identity. Process 136 then performs an initialize channel process 54 (FIG. 5) that initializes a secure receive channel, using the posted security certificate from the ultimate source entity. A traffic decryption key is formed that is identical to one that would have been formed if a channel were being formed directly between source and destination entities. When a security certificate has not been posted, an audit record is generated by process 54. Otherwise, process 136 performs query task 144 to determine whether the COMPUSEC attributes of the requesting application 42 are compatible with the current COMSEC attribute for security kernel 36. When these attributes are not compatible, task 146 audits the security linkage violation and program control exits process 136. No request for mail is delivered and no mail data are received.

When the COMPUSEC and COMSEC attributes are compatible, process 136 performs receive data process 114 (FIG. 11) to obtain any mail data that may be available at the mail server. During receive data process 114, the mail server transfers encrypted mail data to the requesting node. Security kernel 36 for requesting node 26 decrypts the mail data and presents it to interface 44, where it is checked for possible security linkage violations, as discussed above in connection with process 114. After process 114, program control exits process 136.

In summary, the present invention provides an improved method of operating a secure node in a computer network. A secure link is provided between a COMPUSEC protected system and a COMSEC protected system. A trusted interface provides a set of common communication-related services for COMPUSEC protected system. This set of common communication-related services simplifies the development of networking applications for secure computers and the investigations needed to verify the secure nature of such applications.

The present invention has been described above with reference to preferred embodiments. However, those skilled in the art will recognize that changes and modifications may be made in these preferred embodiments without departing from the scope of the present invention. For example, those skilled in the art will appreciate that the flow charts presented herein are intended to teach the present invention and that different techniques for implementing program flow that do not necessarily lend themselves to flowcharting may be devised. In particular, each task discussed herein may be interrupted to permit program flow to perform background or other tasks. In addition, the specific order of tasks may be changed and the specific techniques used to implement the tasks may differ from network to network. These and other changes and modifications which are obvious to those skilled in the art are intended to be included within the scope of the present invention.

What is claimed is:

1. A method of operating a secure node in a computer network, said method comprising steps of:
   (a) performing a trusted process on said secure node, said trusted process associating security attributes with data provided thereby;
   (b) establishing a security kernel for managing communications with other nodes on said network, said security kernel associating communication security attributes with network communication channels; and
   (c) determining whether said trusted process data security attributes are compatible with said communication security attributes.

2. A method as claimed in claim 1 wherein said step (c) is performed in a trusted interface between said trusted process and said security kernel.

3. A method as claimed in claim 1 wherein said trusted process is a trusted operating system that manages the operations of a plurality of applications.

4. A method as claimed in claim 3 wherein:
   at least one of said applications imports data;
   said trusted process additionally associates data security attributes with said at least one application; and
   said step (c) additionally comprises a step of resolving whether data requested to be imported into said at least one application are associated with communication security attributes that are compatible with said data security attributes for said at least one application.

5. A method as claimed in claim 1 wherein said step (c) comprises substeps of:
   (c1) evaluating a request to transmit said data from said node to a destination entity; and
   (c2) resolving whether said destination entity is authorized to receive said data.

6. A method as claimed in claim 5 wherein said step (c) additionally comprises substeps of:
   (c3) generating an audit record when said destination entity is not authorized to receive said data; and
   (c4) providing said audit record to said trusted process.

7. A method as claimed in claim 5 wherein said step (c) additionally comprises a step (d) of resolving whether a secure channel is available for transmitting said data to said destination entity.

8. A method as claimed in claim 5 wherein said step (b) comprises substeps of:
   (b1) initializing a communication channel between said process and said destination entity; and
   (b2) associating a security attribute with said communication channel.

9. A method as claimed in claim 8 additionally comprising steps of:
   (d) transmitting said data through said channel; and
   (e) continuously verifying, as said data are being transmitted, that said channel security attribute is compatible with said data security attribute.

10. A method as claimed in claim 9 additionally comprising a step (f) of packaging said data in accordance with a predetermined security protocol.

11. A method as claimed in claim 5 wherein said step (c) additionally comprises a substep (c3) of identifying a mail server to use for storing said data.

12. A method as claimed in claim 11 wherein said step (c) additionally comprises a substep (c4) of verifying that a security certificate for said node has been posted with said mail server.

13. A method as claimed in claim 1 additionally comprising a step (d) of posting a security certificate at a mail server node of said network, said security certificate being used for encrypting mail data.

14. A method of operating a computer network having unsecured communication links to remotely store secure mail data, said method comprising steps of:
   (a) posting a security certificate from a destination node at a common node;
   (b) requesting to transmit mail data from a source node to said destination node via remote storage in a mail server node;
   (c) obtaining, at said source node in response to said requesting step, said security certificate from said common node;
   (d) encrypting said mail data in response to said security certificate to provide encrypted mail data; and
   (e) sending, after said step (d), said encrypted mail data to said mail server node for storage therein.

15. A method as claimed in claim 14 additionally comprising steps of:
   (f) identifying processes which operate at said source node and which are authorized to send mail;
   (g) verifying that said source node is authorized to post a source security certificate; and
   (h) posting said source security certificate from said source node at said common node.

16. A method as claimed in claim 14 additionally comprising steps of:
   (f) sending a message from said destination node to said mail server, said message requesting said mail server to send said encrypted mail data to said destination node;
   (g) transmitting said encrypted mail data from said mail server to said destination node in response to said sending step; and (h) decrypting said encrypted mail data in response to said security certificate.

17. A method as claimed in claim 16 wherein said source node and said destination node are the same node.

18. A method as claimed in claim 16 wherein said source node and said destination node are different nodes.

19. A method as claimed in claim 14 wherein said step (b) additionally comprises, prior to said step (c), substeps of:

(b1) verifying, at said source node, that said destination node is authorized to receive said encrypted mail data; and (b2) identifying, in response to an identification of said destination node, an address for said mail server.

20. A method as claimed in claim 19 wherein said substep (b2) additionally comprises a substep (b3) of verifying that said security certificate for said source node has been posted at said common node.

21. A method as claimed in claim 14 wherein:

said step (c) comprises a substep (c1) of establishing a communication channel between said mail server node and said source node, said communication channel having a communication security attribute associated therewith;

data security attributes are associated with said mail data at said source node; and said step (e) comprises a substep (e1) of determining whether said data security attributes are compatible with said communication security attribute.

22. A method of operating a secure node in a computer network, said method comprising steps of:

(a) running a trusted operating system which manages an application that transmits data away from said secure node, said trusted operating system associating data security attributes with said data;

(b) establishing a security kernel for managing communication channels with other nodes on said network, said security kernel associating communication security attributes with said communication channels;

(c) evaluating, in an interface between said trusted operating system and said security kernel, a request from said application to transmit said data to a destination entity; and (d) determining, in said interface, whether said data security attributes are compatible with said communication security attributes.

23. A method as claimed in claim 22 wherein said step (d) comprises a substep (d1) of resolving whether said destination entity is authorized to receive said data.

24. A method as claimed in claim 22 wherein said step (c) comprises a substep (c1) of resolving whether a secure channel is available for transmitting said data to said destination entity.

25. A method as claimed in claim 22 wherein said step (b) comprises substeps of:

(b1) initializing a communication channel between said process and said destination entity; and (b2) associating a communication security attribute with said channel.

26. A method as claimed in claim 25 additionally comprising steps of:

(e) transmitting said data through said channel; and (f) continuously verifying, as said data are being transmitted, that said communication security attribute is compatible with said data security attributes.

27. A method as claimed in claim 22 wherein said step (c) additionally comprises a substep (c1) of identifying a mail server to use for temporarily storing said data.

* * * * *